United States Patent [19]

Dalton et al.

[11] Patent Number: 5,721,319
[45] Date of Patent: Feb. 24, 1998

[54] GOLF BALL COVER

[75] Inventors: Jeffrey Lawrence Dalton, North Dartmouth; Robert James Cotter, Jr., Mattapoisett, both of Mass.

[73] Assignee: Acushnet Company, Fairhaven, Mass.

[21] Appl. No.: 591,250

[22] Filed: Jan. 19, 1996

Related U.S. Application Data

[63] Continuation of Ser. No. 175,065, Dec. 29, 1993, abandoned.
[51] Int. Cl.$^6$ .................................................. C08F 8/44
[52] U.S. Cl. .................. 525/196; 273/58 A; 273/58 J; 273/DIG. 22
[58] Field of Search .................. 525/196; 273/235 R, 273/58 A, 58 J

[56] References Cited

U.S. PATENT DOCUMENTS

| | | | |
|---|---|---|---|
| 4,984,804 | 1/1991 | Yamada et al. | 273/235 R |
| 5,068,151 | 11/1991 | Nakamura | 428/407 |
| 5,120,791 | 6/1992 | Sullivan | 525/196 |
| 5,298,571 | 3/1994 | Statz et al. | 525/330.2 |
| 5,324,783 | 6/1994 | Sullivan | 525/196 |
| 5,328,959 | 7/1994 | Sullivan | 525/196 |

*Primary Examiner*—Ana Woodward
*Attorney, Agent, or Firm*—Pennie & Edmonds LLP

[57] ABSTRACT

A polymer blend and a golf ball employing a cover formed of that polymer blend are disclosed. The polymer blend is made from about 5 to about 95 phr of the polymer blend. About 5 to about 95 phr resin is included in the blend. The ball that employs the cover of the polymer blend has excellent click and feel, as well as excellent spin characteristics.

12 Claims, No Drawings

GOLF BALL COVER

This is a continuation of application Ser. No. 08/175,065, filed Dec. 29, 1993, now abandoned.

FIELD OF THE INVENTION

This invention relates to golf ball cover compositions comprising blends of sodium ionomers and at least one lithium ionomer. Golf balls which employ the cover compositions of the present invention have improved click and feel, as well as excellent spin rates and impact durability.

BACKGROUND OF THE INVENTION

Three types of golf balls are marketed, namely one-piece, two-piece and wound. One-piece balls are molded from a homogeneous mass of material, while two-piece balls are made by molding a cover about a solid core. Wound balls are made by molding a cover about a wound core. A wound core is prepared by winding thin elastic thread about a center core material.

Golf ball cores, whether wound or solid, typically measure from 1.4 to 1.6 inches (3.5 to 4.1 cm) in diameter. The cover is molded about the core to form a golf ball that has the minimum United States Golf Association (USGA) specified diameter of 1.68 inches (4.3 cm). Typically, the cover has a thickness of about 0.04 inches (0.1 cm).

Both two-piece and wound golf balls are made by molding covers about cores in one of two ways: by injection molding fluid cover stock material around a core that is held in a retractable pin mold and solidifying the cover stock material into a half-shell shape; or by compression molding preformed half-shells about a core.

Balata was the standard cover stock material until the middle 1960's when E. I. DuPont de Nemours and Co. discovered a new species of resins known as ionomer resins. These resins are sold under the trademark SURLYN™ and, to a large extent, have replaced balata as a cover stock material. SURLYN™ resins are formed of a copolymer of an olefin and an alpha, beta ethylenically unsaturated carboxylic acid with 10–90% of the carboxylic acid groups neutralized by a metal ion. See U.S. Pat. No. 3,264,272. Today, the commercially available ionomer resins are copolymers of ethylene and methacrylic or acrylic acid. These ionomer resins are distinguished by the type of metal ion, the amount of acid, and the degree of neutralization.

Dunlop Rubber Company obtained the first patent on the use of Surlyn in the cover of a golf ball, see U.S. Pat. No. 3,454,280. Since then, there have been a number of disclosures directed to use of ionomer resins in golf ball covers. See, for example, U.S. Pat. No. 3,819,768; U.S. Pat. No. 4,323,247; U.S. Pat. No. 4,526,375; U.S. Pat. No. 4,884,814; and U.S. Pat. No. 4,911,451.

In 1986, DuPont introduced lithium ionomer resins which are formed as copolymers of ethylene and methacrylic acid. DuPont suggested that lithium ionomer resins be used to produce golf ball covers which would be harder and more cut resistant. DuPont also suggested that a golf ball having a cover made from a lithium ionomer resin would go farther, have a higher coefficient of restitution, and be more durable. DuPont further suggested that lithium ionomer resins could be used in blends with other ionomer resins where they can impart better cut resistance to those other resins.

Lithium ionomers have been employed with sodium surlyns to provide blends useful as cover compositions in golf ball compositions. See U.S. Pat. No. 5,000,459 to Isaac. Cover compositions formed of blends of lithium and sodium ionomers have provided balls with excellent durability.

Despite the durability and cut resistance advantages of Surlyn covered golf balls, the ball of choice among advanced amateur players and tour professionals continues to be the balata covered wound ball. The balata covered ball continues to be favored because it achieves high spin rates sufficient to enable the player to more precisely control ball direction and distance, particularly on shorter approach shots. Excessive spin rates, however, are undesirable due to loss of distance on longer shots. Balata covered balls are also favored because of superior click and feel imparted at impact. Balata covered wound balls, however, are expensive. Balata covered wound balls also are easily cut and lack both durability and crack resistance.

A need therefore continues for golf balls which have click and feel similar to balata balls but which have superior durability and cut resistance and spin rates similar to balls having ionomer covers.

SUMMARY OF THE INVENTION

In a first embodiment of the invention, a composition adapted for use as a golf ball cover is provided. The composition is a blend comprising 5–95 parts by weight based on 100 parts by weight resin (phr) of a first component of a blend of sodium ionomer resins and 5–95 phr of a second component of one or more lithium ionomer resins. The blend of sodium ionomer resins comprises at least one low flexural modulus sodium ionomer resin. The amount of the low flexural modulus sodium ionomer resin is about 5 to about 30 phr, preferably about 15 to about 22.5 phr, most preferably about 15 phr of the total composition. The amount of lithium ionomer resin is about 5 to about 95 phr, preferably about 55 to about 62.5 phr, most preferably about 55 phr of the total composition.

The low flexural modulus sodium ionomer resins used in the present invention have flexural modulii between 1,000 and 20,000 psi (7 and 140 MPa), more preferably, between 2,000 and 10,000 psi (14 to 70 Mpa), most preferably about 2000 to about 5000 psi (about 14 to about 34 MPa).

Sodium ionomers which may be employed in the first component of the polymer blends of the invention are copolymers comprising 95 to 80 parts by weight of copolymer of ethylene and 5 to 20 parts by weight of the copolymer of acrylic or methacrylic acid in which 10% to 90% of the acid groups are neutralized by sodium. A low flexural modulus sodium ionomer formed of a terpolymer of 5–50 weight percent of a softening comonomer of a lower alkyl carboxylic acid ester such as n- or iso-butyl acrylate, 4–30 weight percent of either acrylic acid or methacrylic acid in which 5–95 percent of the acid groups are neutralized by sodium, and the remainder ethylene comonomer also is employed in the first component of composition.

Lithium ionomers which may be employed in the cover blends of the invention are copolymers comprising 95 to 80 parts by weight of ethylene and 5 to 20 parts by weight of acrylic or methacrylic acid, based on 100 parts by weight copolymer. Useful lithium ionomers have 10% to 90% of the acid groups neutralized by lithium.

Lithium ionomers employed in the compositions and cover blends of the invention have a flexural modulus above about 60,000 psi (415 MPa). Preferably, the lithium ionomer resins have a flexural modulus between about 60,000 and about 80,000 psi (415 and 550 MPa), most preferably about 60,000 psi to about 70,000 psi (415 to 485 MPa). The flexural modulus is measured in accordance with A.S.T.M. Method D-790.

Both the lithium and sodium ionomer resins employed in the compositions of the invention typically have 10% to 90% of their carboxylic acid groups neutralized by their respective metal ions. Preferably, both the lithium and sodium ionomer resins have about 35%–65% their carboxylic acid groups neutralized by the metal ion. The lithium and sodium ionomer resins employed have the same monocarboxylic acid, e.g. either methacrylic or acrylic acid.

A golf ball having a cover comprising the polymer compositions described above also is provided.

Having briefly summarized the invention, the invention will now be described in detail by reference to the following specification and non-limiting examples. Unless otherwise specified, all temperatures are in degrees Celsius.

DETAILED DESCRIPTION OF THE INVENTION

To aid in the processing of fluid cover stock, it is conventional to use a plurality of ionomer resins to obtain desired characteristics. Ionomer resins with different melt flow indexes therefore are employed to obtain the desired characteristics of the fluid cover stock. In order to adjust the characteristics of the fluid cover stock, other ionomer resins besides sodium and lithium can be employed.

Lithium ionomer resins useful in the invention are illustrated by, but are not limited to those sold under the trade name SURLYN 7940, SURLYN 7930 and SURLYN 8118. SURLYN 7940 is preferred. All of these ionomers are available from Du Pont.

Sodium ionomers useful in the first component of the compositions of the invention are illustrated by, but are not limited to those sold by DuPont under the name SURLYN 8269, SURLYN 8265, SURLYN 8120, and SURLYN 8660. Low flexural modulii sodium ionomers useful in the invention are illustrated by, but are not limited to those sold by DuPont under the name SURLYN 8320, SURLYN 8269.

SURLYN 8118, 7930 and 7940 have flexural modulii of 61,000, 67,000 and 61,000 psi (420, 460 and 420 MPa) respectively. SURLYN 8269 and SURLYN 8320 each have a flexural modulus of 2,800 psi (19 MPa). SURLYN 8265 and SURLYN 8120 each have a flexural modulus of 7,100 psi (49 MPa), respectively. SURLYN 8660 has a flexural modulus 34,000 psi (234 MPa).

SURLYN 8118, 7930 and 7940 have melt flow indexes of about 1.4, 1.8 and 2.6 g/10 min., respectively. SURLYN 8269, SURLYN 8320, SURLYN 8265 and SURLYN 8120 each have a melt flow index of about 0.9 g/10 min. SURLYN 8660 has a melt flow index of 10 gm/10 min. Melt flow index is measured in accordance with A.S.T.M. Test D 1238, condition E, procedure A. Blends of ionomer resins useful to make a cover of a golf ball in accordance with the present invention typically have a melt flow index between about 1.0 to about 4.0 g/10 min., preferably about 2.0 to about 3.0 g/10 min.

The combined amount of lithium ionomer resin and sodium ionomer resin used to make a cover in accordance with the present invention generally makes up about 90% by weight of the total weight of the golf ball cover, preferably at least about 95% by weight. Additional materials which may be included in the golf ball cover compositions include coloring dyes and pigments, resins such as polybutadiene, polyurethane and polyisoprene; whitening agents such as titanium dioxide; dyes; UV absorbers; optical brighteners; and other additives which are conventionally included in golf ball covers.

Golf ball covers in accordance with the present invention are made in a conventional manner by molding cover stock formed of the ionomer blends about a core. Molding is accomplished either by injection molding cover stock about a core or by compression molding preformed half-shells of the cover stock about a core. The preferred method is compression molding. Half-shells are made by using well known injection molding techniques to form the cover stock into a conventional half-shell mold heated to about 450° F. The period of injection molding typically is about 40 seconds. Golf balls which employ these covers also are formed in a conventional manner wherein preformed half-shells are placed about a core and the assembly is introduced into a compression molding machine.

The half-shells are compression molded about the core at about 260° F.–300° F. for about 3 minutes to provide a golf ball having a cover formed of the ionomer blends of the invention. The molded balls are then cooled while in the mold and removed when the cover is hard enough to be handled without deforming. After the balls have been molded, they undergo various conventional finishing operations such as buffing, painting and stamping.

Blending of ionomer resins to provide cover stock for use in the golf ball covers is accomplished in a conventional manner using conventional equipment. Good results have been obtained by mixing the ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding about a core or for molding flowable cover stock about a core using a retractable-pin mold. Such machines are well known in the art.

The compression molding machine is a hydraulic press having an upper and lower mold plate. See U.S. Pat. No. 4,508,309. As taught therein, these mold plates have half molds, each of which is registered with another half mold in the opposite mold plate. As is known in the art, the core can either be a solid core suitable for providing two piece balls, or a wound core suitable for providing three piece balls.

These and other aspects of the present invention may be more fully understood by reference to the following examples.

EXAMPLES 1–6

A set of 72 balls is prepared from each of the formulations given in Table 1.

TABLE 1

| INGREDIENTS/ EXAMPLE | Cation | Modulus (PSI) | Cover Stock (Amounts phr) | | | | | |
|---|---|---|---|---|---|---|---|---|
| | | | 1 | 2 | 3 | 4 | 5 | 6 |
| Surlyn 7940 | Li | 67,000 | 70 | 62.5 | 55 | 47.5 | 40 | 50 |
| Surlyn 8920 | Na | 55,000 | 25 | 25 | 25 | 25 | 25 | 25 |
| Surlyn 8320 | Na | 2,800 | 0 | 7.5 | 15 | 22.5 | 30 | 10 |
| Surlyn 8660 | Na | 34,000 | 5 | 5 | 5 | 5 | 5 | 10 |
| Blue-White concentrate[1] | | | 5 | 5 | 5 | 5 | 5 | 5 |

[1]From Quantum Chemical Co.

The Surlyn ionomers are dry blended in the amounts given in Table 1. The resultant blends are molded into half-shells in a conventional half-shell injection molding machine which heats the cover stock to 232° C. and injects the fluid cover stock into molds to provide half shells. The half-shells are formed about wound cores which are made by winding rubber thread around a solid rubber spherical center. The assembled balls are then compression molded, buffed, sandblasted, and painted to yield golf balls which have diameters of about 1.68 inches (4.3 cm) and nominal cover thicknesses of about 0.04 inches (0.1 cm).

The balls are tested for coefficient of restitution("COR"), Driver Spin rate, Durability(hits to 50% failure), and feel. The COR is measured by firing a ball from a cannon at 125 ft/sec into a steel plate set perpendicular to the path of the ball. The velocity of the ball is measured approaching the plate, and after the ball rebounds from the plate. The rebound velocity divided by the inbound velocity is the COR.

The spin rate is determined by measuring the rotation speed of a ball struck by a True Temper mechanical golfer equipped with a driver. The machine is configured to give a 9 degree launch angle, 3000 rpm back spin, and 160 ft/sec initial velocity using a Pinnacle Gold standard ball.

Durability is measured by subjecting a dozen balls from each of Examples 2-6 to multiple hits on a rotating pendulum machine. The 50% durability level is the number of hits required to cause 50% of the balls to crack or break.

Feel is measured by giving a dozen balls from each of Examples 2-6 to each of five skilled golfers. The golfers rated the balls on a scale from 1 to 5 with 1 being softest and 5 being hardest. The golfers rated the balls on drivers, 5 irons, 9 irons and putters to provide an overall Feel Score. The Feel Score for each club type and the overall Feel Score is given in Table 2. The overall Feel Score is the sum of the average ratings for each club type.

TABLE 2

| Property/Example | 1 | 2 | 3 | 4 | 5 |
| --- | --- | --- | --- | --- | --- |
| Spin Rate(RPM) | 3710 | 3663 | 3682 | 3670 | 3771 |
| Durability(50%) | 450 | 550 | 650 | 850 | 850 |
| Velocity(FT/SEC) | 252.47 | 253.29 | 253.13 | 252.99 | 252.80 |
| Feel Score-Driver | 4.5 | 3.0 | 1.0 | 3.5 | 3.0 |
| -5 Iron | 4.5 | 2.0 | 2.0 | 2.0 | 4.5 |
| -9 Iron | 4.5 | 4.5 | 2.5 | 2.0 | 1.5 |
| -Putter | 4.5 | 3.5 | 2.5 | 3.5 | 1.0 |
| -Overall | 18.0 | 13.0 | 8.0 | 11.0 | 10.0 |
| COR | .801 | .801 | .800 | .797 | .796 |

EXAMPLES 7-12

Examples 7-12 illustrate additional compositions in accordance with the invention which may be used as cover blends for golf balls. These compositions are given in Table 3.

TABLE 3

| Component (phr)/Example | 7 | 8 | 9 | 10 | 11 | 12 |
| --- | --- | --- | --- | --- | --- | --- |
| Surlyn 7930 | | 15 | 15 | | 10 | 20 |
| Surlyn 7940 | 55 | 40 | 20 | 60 | 50 | 15 |
| Surlyn 8118 | | | 20 | | | 25 |
| Surlyn 8230 | 5 | 10 | 15 | 20 | 25 | 30 |
| Surlyn 8269 | 15 | 10 | 12 | 10 | | 2 |
| Surlyn 8265 | 10 | 10 | 7 | 3 | | 1 |
| Surlyn 8120 | 10 | 10 | 6 | 2 | 10 | 2 |
| Surlyn 8660 | 5 | 5 | 5 | 5 | 5 | 5 |
| Blue-White concentrate[1] | 5 | 5 | 5 | 5 | 5 | 5 |

[1]From Quantum Chemical Co.

It will be understood that the claims are intended to cover all changes and modifications of the preferred embodiments of the invention, herein chosen for the purpose of illustration, which do not constitute a departure from the spirit and scope of the invention.

What is claimed is:

1. A golf ball comprising a cover and a core, wherein the cover comprises a polymer blend of from about 40 to about 62.5 parts per hundred of at least one lithium ionomer having a flexural modulus of at least about 60,000 psi, from about 5 to about 30 parts per hundred of at least one first sodium ionomer, having a flexural modulus of from about 1,000 to about 20,000 psi, wherein the first sodium ionomer is a terpolymer of ethylene, a carboxylic acid ester, and acrylic acid or methacrylic acid, and wherein at least part of the acid groups on the first sodium ionomer are neutralized by sodium, and from about 30 to about 55 parts per hundred of at least one second sodium ionomer, wherein the second sodium ionomer is a copolymer of ethylene and acrylic or methacrylic acid, and wherein at least part of the acid groups on the second sodium ionomer are neutralized by sodium;

wherein the golf ball has a spin rate comparable to that of a golf ball having an ionomer cover, wherein the ionomer cover comprises a blend of ionomers, and each ionomer in the blend has a flexural modulus of at least about 34,000 psi.

2. The golf ball according to claim 1, wherein the at least one lithium ionomer has a flexural modulus in the range of from about 60,000 psi to about 80,000 psi.

3. The golf ball according to claim 1, wherein the polymer blend comprises at least two lithium ionomers.

4. The golf ball according to claim 1, wherein the at least one lithium ionomer is present in an amount of from about 55 to about 62.5 parts per hundred.

5. The golf ball according to claim 1, wherein the at least one second sodium ionomer is present in an amount of from about 30 to about 35 parts per hundred.

6. A golf ball comprising a cover and a core, wherein the cover comprises from about 37.5 to about 60 parts per hundred of a sodium ionomer blend of at least three sodium ionomer resins and from about 62.5 to about 40 parts per hundred of at least one lithium ionomer, wherein at least one of the sodium ionomer resins is a terpolymer of ethylene with about 5 to about 50 weight percent of a softening comonomer of any of n- or iso-butyl acrylate and about 4 to about 30 weight percent of either acrylic acid or methacrylic acid in which about 5 to about 95 percent of the acid groups are neutralized by sodium, the terpolymer having a flexural modulus of from about 2,800 to about 7,100 psi, and the at least one lithium ionomer has a flexural modulus of at least about 60,000 psi, and is a copolymer of about 95 to about 80 parts by weight ethylene and about 5 to about 20 parts by weight acrylic or methacrylic acid based on 100 parts by weight of copolymer, wherein from about 10 to about 90% of the acid groups are neutralized by lithium ions.

7. The golf ball according to claim 6, wherein the at least one lithium ionomer has a flexural modulus in the range of from about 60,000 psi to about 80,000 psi.

8. The golf ball according to claim 6, wherein the at least one lithium ionomer is present in an amount of from about 55 to about 62.5 parts per hundred, and the sodium ionomer terpolymer is present in an amount of from about 22.5 to about 15 parts per hundred.

9. The golf ball according to claim 8, wherein the at least one lithium ionomer is present in an amount of about 62.5 parts per hundred, and the sodium ionomer terpolymer is present in an amount of about 15 parts per hundred.

10. The golf ball according to claim 9, wherein the sodium ionomer copolymer is present in an amount of about 32.5 parts per hundred.

11. The golf ball according to claim 6, wherein at least one of the sodium ionomer resins is a copolymer of from about 95 to about 80 parts by weight ethylene and from about 5 to about 20 parts by weight acrylic or methacrylic acid based on 100 parts by weight of copolymer, wherein from about 10 to about 90% of the acid group neutralized by sodium ions.

12. The golf ball according to claim 11, wherein the sodium ionomer copolymer has a flexural modulus of from about 34,000 to about 55,000 psi.

* * * * *